C. E. LINDSEY.
NUT LOCK.
APPLICATION FILED FEB. 14, 1911.
1,018,199.
Patented Feb. 20, 1912.
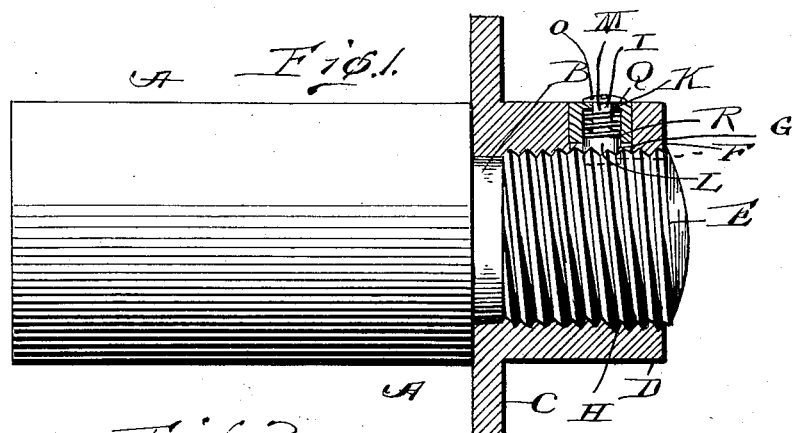
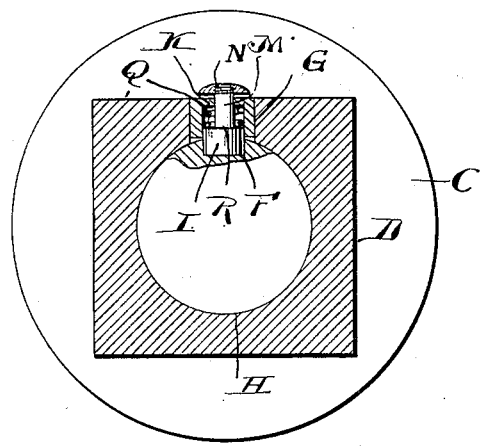
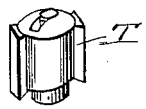
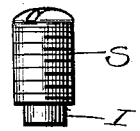
Charles E Lindsey
Inventor
Witnesses

UNITED STATES PATENT OFFICE.

CHARLES E. LINDSEY, OF BIRMINGHAM, ALABAMA, ASSIGNOR OF ONE-EIGHTH TO E. E. DUPRAY, ONE-FOURTH TO LOUIS SCHULHOEFER, ONE-SIXTEENTH TO GEORGE HAGUE, AND ONE-SIXTEENTH TO JAMES LINDSEY, ALL OF BIRMINGHAM, ALABAMA.

NUT-LOCK.

1,018,199.   Specification of Letters Patent.   Patented Feb. 20, 1912.

Application filed February 14, 1911. Serial No. 608,631.

*To all whom it may concern:*

Be it known that I, CHARLES E. LINDSEY, a citizen of the United States, residing at Birmingham, in the county of Jefferson and State of Alabama, have invented certain new and useful Improvements in Nut-Locks, of which the following is a specification.

My invention relates to improvements in nut locks, which while capable of use in any situation where it would perform the desired function, is particularly adapted for use upon nuts used on the spindles of vehicle axles.

The object of my invention is the provision of a nut lock of the character and for the purpose stated which will be thoroughly efficient and practical from every standpoint and which will be of the simplest, cheapest and most durable construction.

With this object in view my invention consists of a nut lock embodying the novel features of construction and combination of parts as substantially disclosed herein.

Figure 1 represents a side elevation of a portion of a vehicle axle, partly in section, equipped with my nut lock. Fig. 2 represents a vertical sectional view through the nut and locking devices, the spring and bolt being shown in elevation to more clearly disclose the construction and arrangement of parts. Fig. 3 represents a view of the parts constituting the nut lock. Fig. 4 represents a slightly modified form of nut lock, and Fig. 5 represents another modified construction of the nut lock.

In the drawings:—The letter A designates the axle skein, B the spindle and C the flange of the nut D. The axle is formed with the threaded end E, which is provided at a determined place with a cylindrical socket F adapted to register with the opening G, leading from the threaded bore or passage H of the nut. From this construction, it will be seen that when the nut is screwed home on the axle, the opening in the nut alines or registers with the socket of the axle and my locking device fits snugly in said opening of the nut.

The locking device consists of the sleeve J, having the interior annular shoulder K, the locking pin L, having reduced stem M and upper threaded end N, engaged by the securing nut or cap O, threaded to engage the upper threaded end N of the pin L, and around the stem M and within the space between the stem and sleeve is the coil spring Q, which bears upon the shoulder of the sleeve and the shoulder R on the locking bolt and retains the bolt in positive engagement.

In the modified form shown in Fig. 5, I provide the sleeve with threads S and in Fig. 4, I provide the key and slot connection T for connecting the sleeve with the nut.

It will be observed that my locking device is fitted snugly and entirely concealed in the nut, operates instantly to effect the locking, but can be quickly released, and that the device, while adding practically nothing to the cost of the axle, greatly increases the efficiency and desirability of the axle.

I claim:—

1. In a nut-lock device, the combination with the axle having the reduced threaded end, provided with a cylindrical socket, a nut fitted on the threaded end and provided with a flange for engaging the hub and with an opening adapted to aline with the socket in the threaded end, a sleeve mounted in said opening, and a spring-actuated locking pin confined in the sleeve and carrying a head at its upper end.

2. In a nut-lock, the combination with the axle having the reduced threaded end, provided with a cylindrical socket, a nut fitted on the threaded end and provided with a flange for engaging the hub and with an opening adapted to aline with the socket in the threaded end, a sleeve mounted in said opening, and a spring-actuated locking pin confined in the sleeve and carrying a head at its upper end, said nut being formed with slots and the sleeve being provided with vertical keys to engage said slots for securing the sleeve in the nut.

In testimony whereof I affix my signature, in presence of two witnesses.

CHARLES E. LINDSEY.

Witnesses:
E. E. DUPRAY,
A. L. SINCLAIR.